(12) United States Patent
Tanaka et al.

(10) Patent No.: US 6,493,144 B2
(45) Date of Patent: Dec. 10, 2002

(54) OPTICAL COMPONENT (75) Inventors: Katsuto Tanaka, Kawachinagano (JP); Masaaki Nose, Kawachinagano (JP)

(73) Assignee: Minolta Co., Ltd., Osaka (JP)

( * ) Notice: Subject to any disclaimer, the term of this patent is extended or adjusted under 35 U.S.C. 154(b) by 7 days.

(21) Appl. No.: 09/729,790

(22) Filed: Dec. 6, 2000

(65) Prior Publication Data

US 2001/0004300 A1 Jun. 21, 2001

(30) Foreign Application Priority Data

Dec. 21, 1999 (JP) .......................................... 11-362664

(51) Int. Cl.$^7$ ................................................. G02B 1/10
(52) U.S. Cl. ........................ 359/580; 359/581; 359/586
(58) Field of Search ................................ 359/580, 581, 359/586

(56) References Cited

U.S. PATENT DOCUMENTS 5,576,392 A    11/1996    Yamamoto et al.
5,725,959 A    3/1998     Terada et al.
5,725,960 A    3/1998     Konishi et al.

FOREIGN PATENT DOCUMENTS

JP    6-312467    11/1994

*Primary Examiner*—Cassandra Spyrou
*Assistant Examiner*—Fayez Assaf
(74) *Attorney, Agent, or Firm*—Morrison & Foerster LLP (57) ABSTRACT An optical component is produced by forming an anti-reflection film on a surface of a molding of a norbornene resin having a polar group. The anti-reflection film is composed of an equivalent film of which the overall refractive index as calculated according to a prescribed formula is 1.52 to 1.8 and that has an intermediate layer measuring 10 to 50 nm in mechanical film thickness and containing $Al_2O_3$, a first high-refractive-index layer, and a first low-refractive-index layer containing $SiO_2$ as a main ingredient, a second high-refractive-index layer measuring $0.4\lambda$ to $0.6\lambda$ (where $\lambda$ is 480 to 550 nm) in optical film thickness and containing $TiO_2$ as a main ingredient, and a second low-refractive-index layer measuring $0.2\lambda$ to $0.3\lambda$ in optical film thickness and containing $SiO_2$ as a main ingredient. This ensures that the anti-reflection film adheres to the surface of the molding so strongly as not to exfoliate therefrom.

6 Claims, 3 Drawing Sheets

OPTICAL COMPONENT

This application is based on application No. H11-362664 filed in Japan on Dec. 21, 1999, the entire contents of which are hereby incorporated by reference.

BACKGROUND OF THE INVENTION

1. Field of the Invention

The present invention relates to an optical component produced by forming an anti-reflection film on a surface of a molding of a norbornene resin, and to a method for producing such an optical component.

2. Description of the Prior Art

In recent years, synthetic resins have come to be widely used as materials for optical components such as lenses, mirrors, and prisms. This is because synthetic resins are lighter and cheaper than glass materials, and can easily be molded into complex shapes. Conventionally preferred kinds of such synthetic resins are polymethyl methacrylate (PMMA) and polycarbonate (PC). However, both PMMA and PC are insufficiently heat resistant and in addition moisture-absorbent. Therefore, in practical use, moldings of those resins pose the serious problem of easily changing their shapes and refractive indices.

This has encouraged development of satisfactorily heat-resistant and non-moisture-absorbent synthetic resins, of which one outcome is norbornene resins having no polar group. Norbornene resins have proved to be excellent in transparency, heat resistance, and non-moisture-absorbency, and are thus effective as optical materials.

However, forming a conventional anti-reflection film on a molding of a norbornene resin results in rather low adherence between them, which inconveniently facilitates exfoliation of the anti-reflection film from the molding. The adherence declines particularly sharply at higher ambient temperatures and humidities and with greater film thicknesses. This has prompted attempts to improve the adherence of the anti-reflection film by adding a polar group to the norbornene resin. However, no satisfactory results are known to have been obtained to this date.

SUMMARY OF THE INVENTION

An object of the present invention is to provide an optical component having an anti-reflection film adhering to a surface of a molding of a norbornene resin so strongly as not to exfoliate therefrom, and to provide a method for producing such an optical component.

To achieve the above object, according to one aspect of the present invention, an optical component is provided with: a molding formed out of a material containing a norbornene resin having a polar group; and an anti-reflection film formed on a surface of the molding. This anti-reflection film is composed of, from the molding side to the air side: an equivalent film of which the overall refractive index as calculated according to formula (1) below is 1.52 to 1.8 and that includes, from the molding side to the air side, an intermediate layer measuring 10 to 50 nm in mechanical film thickness and containing $Al_2O_3$, a first high-refractive-index layer, and a first low-refractive-index layer containing $SiO_2$ as a main ingredient, $$N = n_g + \sum_{i=1}^{3} [4(n_i - n_g)n_i n_d] \tag{1}$$

where $n_g$ represents a refractive index of the molding and $n_i$ and $d_i$ represent a refractive index and a mechanical film thickness, respectively, of an i-th layer of the equivalent film as counted from the molding side; a second high-refractive-index layer measuring $0.4\lambda$ to $0.6\lambda$ (where $\lambda$ is 480 to 550 nm) in optical film thickness and containing $TiO_2$ as a main ingredient; and a second low-refractive-index layer measuring $0.2\lambda$ to $0.3\lambda$ (where $\lambda$ is 480 to 550 nm) in optical film thickness and containing $SiO_2$ as a main ingredient.

According to another aspect of the present invention, an optical component is provided with: a molding formed out of a material containing a norbornene resin having a polar group; and an anti-reflection film formed on a surface of the molding. This anti-reflection film is composed of, from the molding side to the air side: a first high-refractive-index layer containing $TiO_2$ as a main ingredient and formed with the molding heated to 70 to 130° C.; a first low-refractive-index layer containing $SiO_2$ as a main ingredient; a second high-refractive-index layer measuring $0.4\lambda$ to $0.6\lambda$ (where $\lambda$ is 480 to 550 nm) in optical film thickness and containing $TiO_2$ as a main ingredient; and a second low-refractive-index layer measuring $0.2\lambda$ to $0.3\lambda$ (where $\lambda$ is 480 to 550 nm) in optical film thickness and containing $SiO_2$ as a main ingredient.

In these optical components according to the present invention, an anti-reflection film composed of specifically defined layers is formed on a surface of a molding of a norbornene resin having a polar group. This ensures that the anti-reflection film adheres to the surface of the molding so strongly as not to exfoliate easily therefrom.

According to another aspect of the present invention, a method for producing an optical component includes: a molding step of forming a molding having a desired shape out of a material containing a norbornene resin having a polar group; a heating step of heating the molding to 70 to 130° C.; and a vapor-deposition step of vapor-depositing an anti-reflection film as a first layer on a surface of the molding.

By this method according to the present invention, first a molding of a norbornene resin is heated to 70 to 130° C., and then a first layer is vapor-deposited on the norbornene-resin molding. This ensures that an anti-reflection film adheres to the surface of the molding so strongly as not to exfoliate therefrom.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 2:
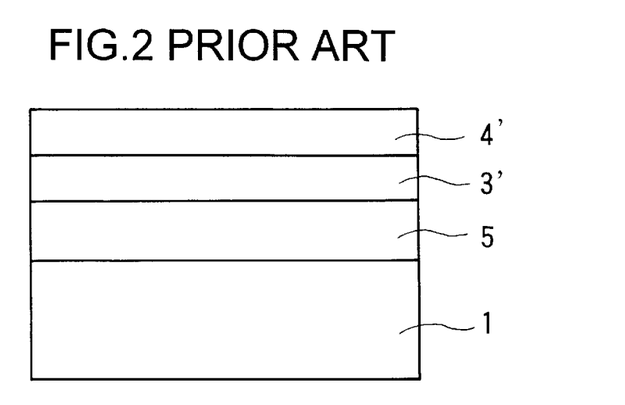
FIG. 2 is a sectional view of a conventional optical component.

The inventors of the present invention investigated why an anti-reflection film formed on a surface of a molding of a norbornene resin having a polar group tends to exfoliate easily therefrom, and learned the fact described below. When an anti-reflection film is formed on a surface of a molding of a resin such as PMMA or PC conventionally used as a material for optical components, as shown in FIG. 2, the anti-reflection film is generally composed of, from the molding surface side, a medium-refractive-index layer 5, a high-refractive-index layer 3', and a low-refractive-index layer 4' that are laid over one another. Here, to enhance the adherence between the molding and the anti-reflection film, the medium-refractive-index layer 5 is generally made of a silicon oxide $SiO_x$ (2>x>1). However, with a molding made of a norbornene resin having a polar group, if a silicon oxide $SiO_x$ is used as the material of the medium-refractive-index layer 5 that makes contact with the molding, this layer does not afford sufficient adhesion.

An optical component according to the present invention is devised on the basis of this newly found fact, and is characterized principally by having instead of a conventional medium-refractive-index layer an equivalent film composed of three specifically defined layers. More specifically, in the present invention, an equivalent film is composed of an intermediate layer measuring 10 to 50 nm in mechanical film thickness and containing $Al_2O_3$, a first high-refractive-index layer, and a first low-refractive-index layer containing $SiO_2$ as a main ingredient, and has an overall refractive index N in the range from 1.52 to 1.8 as calculated according to formula (1) below.

$$N = n_g + \sum_{i=1}^{3} [4(n_i - n_g)n_i d_i] \quad (1)$$

where $n_g$ represents the refractive index of the molding; and $n_i$ and $d_i$ represent the refractive index and the mechanical film thickness, respectively, of the i-th layer of the equivalent film as counted from the molding side.

Figure 1:
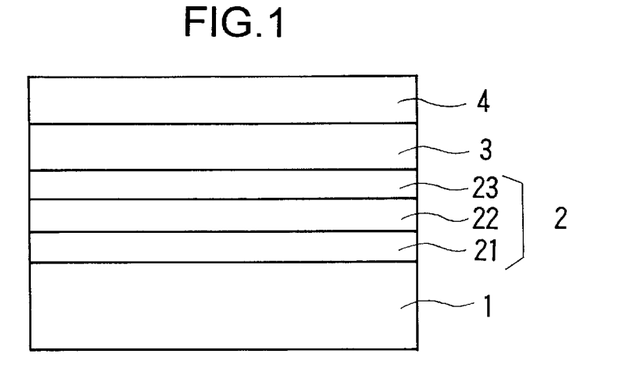
FIG. 1 is a sectional view of an optical component according to the invention.

FIG. 1 shows a sectional view of an optical component according to the present invention. On a surface of a molding 1, an equivalent film 2 is formed that is composed of an intermediate layer 21 containing $Al_2O_3$, a first high-refractive-index layer 22, and a first low-refractive-index layer 23 containing $SiO_2$ as a main ingredient, and, on top thereof, a second high-refractive-index layer 3 and a second low-refractive-index layer 4 are formed in the order named. First, the equivalent film will be described.

By forming first the intermediate layer containing $Al_2O_3$, which excels in adherence to a norbornene resin having a polar group, on the surface of the molding, it is possible to enhance the adherence between the anti-reflection film and the molding. Here, the mechanical film thickness of the intermediate layer needs to be in the range from 10 to 50 nm. With a mechanical film thickness smaller than 10 nm, sufficient adhesion cannot be obtained, with the result that crack development is very likely in the anti-reflection film. On the other hand, with a mechanical film thickness greater than 50 nm, the stress in the intermediate layer is too strong to be ignored, with the result that crack development is very likely in the anti-reflection film when it is left in high-temperature, high-humidity conditions. Preferably, the mechanical film thickness of the intermediate layer is in the range from 20 to 30 nm.

As long as sufficient adherence to the norbornene resin is obtained, the intermediate layer may contain any proportion of $Al_2O_3$. For maximum adherence, the intermediate layer may even be made solely of $Al_2O_3$.

Next, the first high-refractive-index layer and the first low-refractive-index layer will be described. The refractive index and the film thickness of each of these two refractive-index layers are determined appropriately in such a way that the value N calculated according to formula (1) noted above is in the range from 1.52 to 1.8. That is, the equivalent film is so formed as to act just like a conventional medium-refractive-index layer.

The reason that the main ingredient of the first low-refractive-index layer is limited to $SiO_2$ here is that the main ingredient of the second high-refractive-index layer formed on top thereof is $TiO_2$, which exhibits inward membrane stress, and therefore selecting $SiO_2$, which exhibits outward membrane stress, as the material for the former helps cancel membrane stress and thereby suppress film distortion.

The first high-refractive-index layer is given a refractive index higher than 1.8. The specific values of the refractive index and the mechanical film thickness of the first high-refractive-index layer are determined on the basis of the overall refractive index and the desired film thickness of the equivalent film as a whole. The first high-refractive-index layer may be made of any conventionally known material as long as its refractive index is higher than 1.8. For example, $TiO_2$, $ZrO_2$, $CaO_2$, or $Ta_2O_5$ can be used singly or in combination. Among these, using $TiO_2$, which exhibits membrane stress in the direction opposite to the main ingredient $SiO_2$ of the first low-refractive-index layer, is recommended because doing so helps cancel membrane stress between the first low-refractive-index layer and the first high-refractive-index layer and thereby reduce film distortion.

The first low-refractive-index layer is given a refractive index lower than 1.52. The specific values of the refractive index and the mechanical film thickness of the first low-refractive-index layer are determined on the basis of the overall refractive index and the desired film thickness of the equivalent film as a whole.

The overall refractive index N as calculated according to formula (1) noted previously is set to be in the range from 1.52 to 1.8. If the overall refractive index N is lower than 1.52 or higher than 1.8, sufficient anti-reflection effect cannot be obtained. Preferably, the overall refractive index N is in the range from 1.6 to 1.75.

From the viewpoint of anti-reflection effect and membrane stress, the equivalent film is given an optical film thickness preferably in the range from 0.2λ to 0.4λ, and further preferably in the range from 0.2λ to 0.3λ.

Next, before a description of the second high-refractive-index layer, the second low-refractive-index layer will be described. The second low-refractive-index layer contains $SiO_2$ as a main ingredient and measures 0.2λ to 0.3λ in optical film thickness. The reason that $SiO_2$ is used as a main ingredient here is that $SiO_2$ has a low refractive index and can be formed into a hard layer even by low-temperature vapor deposition, and is therefore ideal as the outermost layer of an anti-reflection film, where satisfactory anti-reflection effect and resistance to marring are required. Here, the optical film thickness needs to be in the range from 0.2λ to 0.3λ. With an optical film thickness smaller than 0.2λ or greater than 0.3λ, sufficient anti-reflection effect cannot be obtained.

Now, the second high-refractive-index layer will be described. This high-refractive-index layer contains $TiO_2$ as a main ingredient and measures 0.4λ to 0.6λ in optical film thickness. The reason that $TiO_2$ is used as a main ingredient here is that $TiO_2$ has a high refractive index and exhibits membrane stress in the direction opposite to the main ingredient $SiO_2$ of the second low-refractive-index layer formed on top of this layer, and therefore acts to cancel distortion caused by stress in the second low-refractive-index layer. Here, the optical film thickness needs to be in the range from 0.4λ to 0.6λ. With an optical film thickness smaller than 0.4λ or greater than 0.6λ, sufficient anti-reflection effect cannot be obtained.

In the present invention, as a molding of a norbornene resin having a polar group, it is possible to use a molding of such a norbornene resin alone or a composite body thereof with another material or molding. The molding may be of any shape, and its shape is determined according to the use of the optical component as a whole, which can be, for example, a lens for spectacles or for a camera.

In this resin molding, the anti-reflection film is formed on a surface thereof that the norbornene resin forms. Thus, the anti-reflection film may be formed all over the entire surface of the molding or only on a portion thereof where anti-reflection effect is required.

In the present invention, as a norbornene resin having a polar group, any conventionally known type can be used. For example, it is possible to use a norbornene polymer having a polar group added thereto or a ring-opening polymer of a norbornene monomer having a polar group, or a hydrogenated version thereof, or an addition polymer of a norbornene monomer having a polar group, or an addition copolymer of a norbornene monomer having a polar group and an olefin.

The polar group added to the norbornene monomer may be, for example, a polarity substitution product of a halogen, hydroxyl group, ester group, alkoxy group, cyano group, amido group, imido group, silyl group or the like, or a halogen, hydroxyl group, ester group, alkoxy group, cyano group, amido group, imido group, silyl group, epoxy group, or the like.

The norbornene monomer may be, for example, 2-norbornene, 5-methyl-2-norbornene, 5,5-dimetyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, 5-phenyl-5-methyl-2-norbornene, 5-hexyl-2-norbornene, 5-octyl-2-norbornene, 5-octadecyl-2-norbornene, or the like.

Alternatively, the norbornene monomer may be a monomer obtained by adding one or more cyclopentadiene to a norbornene, or a derivative or substitution product thereof, for example, 1,4:5,8-dimethano-1,2,3,4,4a,5,8,8a-octahydro-2,3-cyclopentadienonaphthalene, 6-methyl-1,4:5,8-dimethano-1,4,4a,5,6,7,8,8a-octahydronaphthalene, 1,4:5,10:6,9-trimithano-1,2,3,4,4a,5,5a,6,9,9a,10,10a-dodecahydro-2,3-cyclopentadienoanthracene, or the like; a polycylic monomer obtained as a polymer of cyclopentadiene, or a derivative or substitute product thereof, for example, dicyclopentadiene, 2,3-dihydrodicyclopentadiene, or the like; an adduct of cyclopentadiene with tetrahydroindene or the like, or a derivative or substitution product thereof, for example, 1,4-methano-1,4,4a,4b,5,8,8a,9a-octahydrofluorene, 5,8-methano-1,2,3,4,4a,5,8,8a-octahydro-2,3-cyclopentadienonaphthalene.

The norbornene resin used in the present invention has a number-average molecular weight preferably in the range from 10,000 to 200,000, and further preferably in the range from 15,000 to 100,000, as measured by a GPC (gel permeation chromatography) method using toluene as a solvent and converted into a polystyrene basis. A norbornene resin having an unsaturated bond in its main chain structure, such as a ring-opening polymer of a norbornene monomer, can be hydrogenated to be turned into a saturated norbornene resin. In this case, hydrogenation is accomplished typically to 90% or more, preferably to 95% or more, and further preferably to 99% or more. Insufficient hydrogenation results in an unduly large proportion of unsaturated bonds left in the main chain structure of the norbornene resin, and thus makes the norbornene resin poorly light-resistant and prone to loss of transparency or of strength or other problems in particular when used in applications involving direct exposure to weather.

The norbornene resin here has a glass transition temperature (Tg) of preferably 110° C. or more, further preferably 120° C. or more, and particularly preferably 130° C. or more. If the norbornene resin has an unduly low Tg, the anti-reflection film cannot be vapor-deposited at a sufficiently high temperature, and thus insufficient adherence may result.

To the norbornene resin, various additives may be added as long as the object of the present invention is satisfactorily achieved. Such additives include, for example, an anti-aging agent such as one based on phenol, phosphorus, or the like; an anti-heat-deterioration agent such as one based on phenol or the like; an ultraviolet-stabilizer agent such as one based on benzophenone or the like; an anti-static agent such as one based on amine or the like; a lubricant such as an ester of an aliphatic alcohol, or a partial ester or partial ether of a polyhydric alcohol. Moreover, the norbornene resin may be mixed with another resin or the like as long as the object of the present invention is satisfactorily achieved.

The molding used in the present invention may be formed in any manner and thus by any conventionally known method such as injection molding, melt extrusion, heat pressing, solvent casting, or drawing.

Moreover, to further enhance the adherence between the norbornene resin molding and the anti-reflection film, the surface of the molding may be subjected to surface reform treatment such as energy beam irradiation treatment or chemical treatment. Energy beam irradiation treatment includes corona discharge treatment, plasma treatment, electron beam irradiation treatment, ultraviolet ray irradiation treatment, and the like.

The anti-reflection film may be formed on the surface of the norbornene resin molding in any manner and thus by any conventionally known method such as vacuum deposition, sputtering, ion plating, or ion-beam assisting. Among these, vacuum deposition is recommended because it offers high productivity, and particularly preferable is a production method according to the present invention as will be described below.

Now, a method for producing an optical component according to the present invention will be described. This production method is characterized in that first a molding of a norbornene resin having a polar group is heated to 70 to 130° C., and then the first layer of an anti-reflection film is vapor-deposited thereon. When an anti-reflection film is formed on a glass member, the layers of the anti-reflection film can be vapor-deposited with the glass member heated to about 300° C. However, with a member made of a conventionally used resin such as PMMA or PC, since it has a low TG and cannot be heated, vapor deposition needs to be performed at ordinary temperatures. This leads to insufficient adherence between the anti-reflection film and the resin molding in particular when the former is composed of multiple layers.

To overcome this problem, the production method according to the present invention exploits the fact that a norbornene resin has a higher TG than a conventionally used resin such as PMMA or PC. Specifically, the first layer of an anti-reflection film, where adherence to a resin molding matters, is vapor-deposited thereon with the resin molding heated to 70 to 130° C., i.e. temperatures higher than conventionally practiced, so that enhanced adherence is obtained between the resin molding and the anti-reflection film. With the norbornene resin molding heated to below 70° C., the adherence between the molding and the anti-reflection film is not enhanced satisfactorily. On the other hand, with the norbornene resin molding heated to above 130° C., the resin may start melting and cause deformation of the molding. The molding needs to be heated in such a way as to reach the above noted temperature range at least before vapor deposition is started and then remain within that temperature range preferably until completion of the vapor deposition of the first layer, and especially preferably until completion of the vapor deposition of all of the two or more layers of which the anti-reflection film is composed. In reality, once the resin molding is heated to within the above noted temperature range, even if the heating is stopped before vapor deposition is started, the molding is usually very likely to remain within that temperature range well until completion of vapor deposition.

From the viewpoint of anti-reflection effect in as wide a range of the spectrum as possible, the production method according to the present invention requires the use of an anti-reflection film composed preferably of multiple layers that are laid over one another, and further preferably of four or more layers for higher reliability. The anti-reflection film may have any layer structure as long as it exerts anti-reflection effect, and is preferably composed of high-refractive-index layers and low-refractive-index layers laid over one another alternately. The main ingredient of the high-refractive-index layers may be, for example, $ZrO_2$, $TiO_2$, $CaO_2$, or $Ta_2O_5$, among which $TiO_2$ is preferable because it offers a high refractive index. The main ingredient of the low-refractive-index layers may be, for example, $MgF_2$ or $SiO_2$.

The first layer of the anti-reflection film may be of any type, and, from the viewpoint of adherence to the substrate, its main ingredient is preferably a metal oxide, and further preferably $TiO_2$ because, as compared with other metal oxides, $TiO_2$ can be formed into a thinner layer and offers excellent adherence.

Optical components according to the present invention, having an anti-reflection film formed on a surface of a molding of a norbornene resin, are used mainly in spectacles and cameras.

EXAMPLES

Hereinafter, the present invention will be described in more detail by presenting practical examples thereof. It is however to be understood that the specific examples described below are not intended to constrain the present invention in any way and therefore that various modifications are possible within the purport of what is described in the present specification and recited in the appended claims.

Example 1

Figure 3:
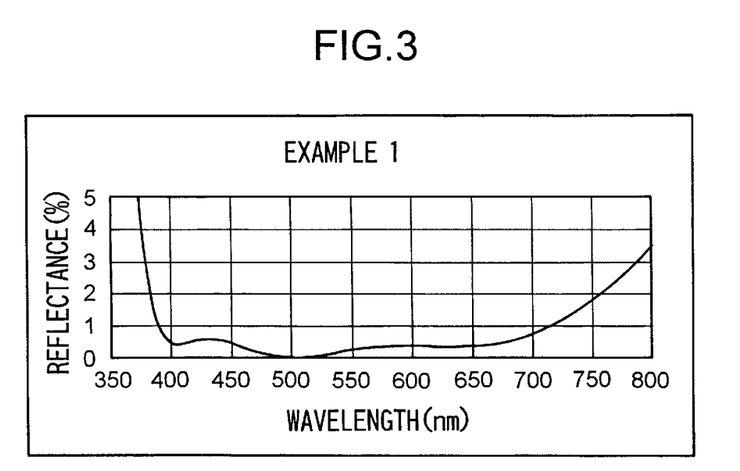
FIG. 3 is a diagram showing the spectral reflectance characteristic of the anti-reflection film of Example 1.

A plate-shaped molding of a norbornene resin having a polar group ("ARTON FX" manufactured by JSR Corporation) was put in a vacuum chamber of a vacuum deposition machine, and the vacuum chamber was then evacuated to obtain a degree of vacuum of $1 \times 10^{-3}$ Pa. Then, the materials listed in Table 1 were, in the order listed, vapor-deposited on the molding at ordinary temperatures to form an anti-reflection film. Here, the material of each layer was heated and evaporated with an electron beam, and the amount of introduced oxygen was adjusted with a solenoid valve controlled in a manner interlocked with a vacuum gauge so that the degree of vacuum inside the vacuum chamber was kept at $1 \times 10^{-3}$ Pa. The optical component thus produced was subjected to tests described below to evaluate its physical properties. The results of the evaluation are shown in Table 6, and the spectral reflectance characteristic of the anti-reflection film obtained is shown in FIG. 3.

Durability Test

The optical component produced was left for 1,000 hours in a constant-temperature chamber of which the inside was kept at a temperature of 70° C. and at a humidity of 80%. Thereafter, the condition of the anti-reflection film was inspected for cracks visually with the naked eye and through a microscope.

Heat-Cycle Test

The optical component produced was subjected to 12 heat cycles each consisting of one hour at −30° C. followed by one hour at 70° C. Thereafter, the condition of the anti-reflection film was inspected for cracks visually with the naked eye and through a microscope.

Adherence Test

A slip of sticky tape ("L Pack" manufactured by Nichiban Co., Ltd.) was affixed on the surface of the anti-reflection film firmly with the pad of a finger, and then the tape was pulled off the film surface vigorously in the direction perpendicular to the film surface to inspect for exfoliation of the film visually with the naked eye and through a microscope.

Example 2

Figure 4:
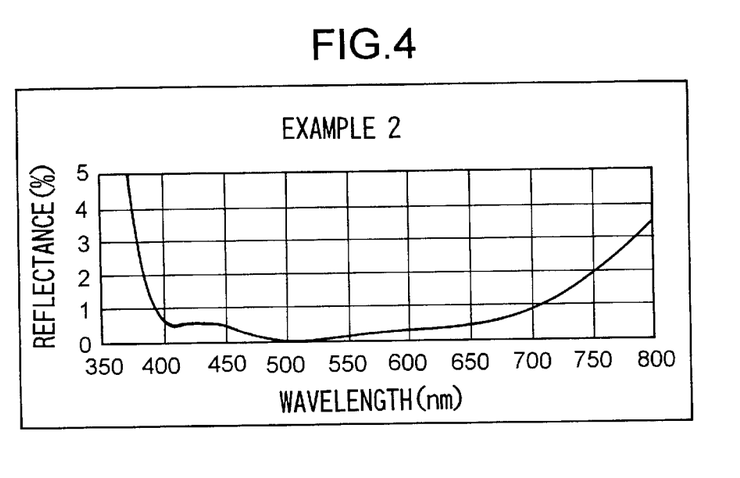
FIG. 4 is a diagram showing the spectral reflectance characteristic of the anti-reflection film of Example 2.

An optical component was produced in the same manner as Example 1 except that the materials listed in Table 2 were vapor-deposited. The optical component thus produced was subjected to the same tests as Example 1 to evaluate its physical properties. The results of the evaluation are shown in Table 6, and the spectral reflectance characteristic of the anti-reflection film obtained is shown in FIG. 4.

Example 3

Figure 5:
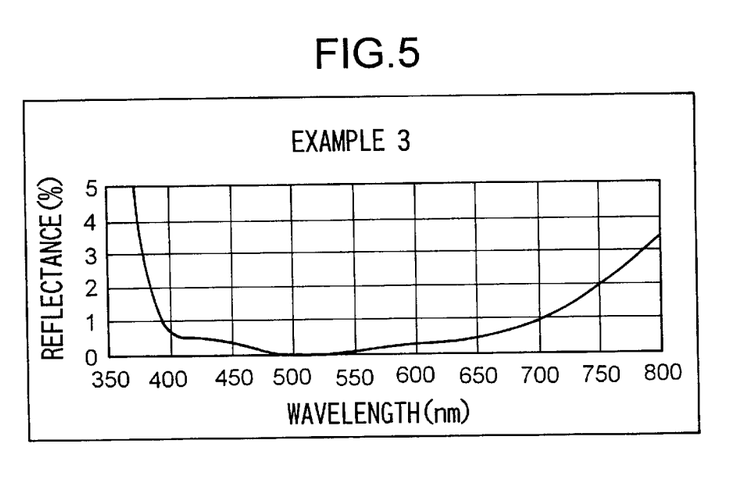
FIG. 5 is a diagram showing the spectral reflectance characteristic of the anti-reflection film of Example 3.

An optical component was produced in the same manner as Example 1 except that the materials listed in Table 3 were vapor-deposited. The optical component thus produced was subjected to the same tests as Example 1 to evaluate its physical properties. The results of the evaluation are shown in Table 6, and the spectral reflectance characteristic of the anti-reflection film obtained is shown in FIG. 5.

Example 4

A plate-shaped molding of a norbornene resin having a polar group ("ARTON FX" manufactured by JSR Corporation) was put in a vacuum chamber of a vacuum deposition machine. Then, the vacuum chamber was evacuated to obtain a degree of vacuum of $1\times10^{-3}$ Pa, and simultaneously the molding was heated to 85° C. with a sheathed heater. Then, the materials listed in Table 4 were, in the order listed, vapor-deposited on the molding to form an anti-reflection film. Here, the molding was kept at a temperature in the range from 75 to 100° C. during vapor deposition. Moreover, the material of each layer was heated and evaporated with an electron beam, and the amount of introduced oxygen was adjusted with a solenoid valve controlled in a manner interlocked with a vacuum gauge so that the degree of vacuum inside the vacuum chamber was kept at $1\times10^{-3}$ Pa.

Figure 6:
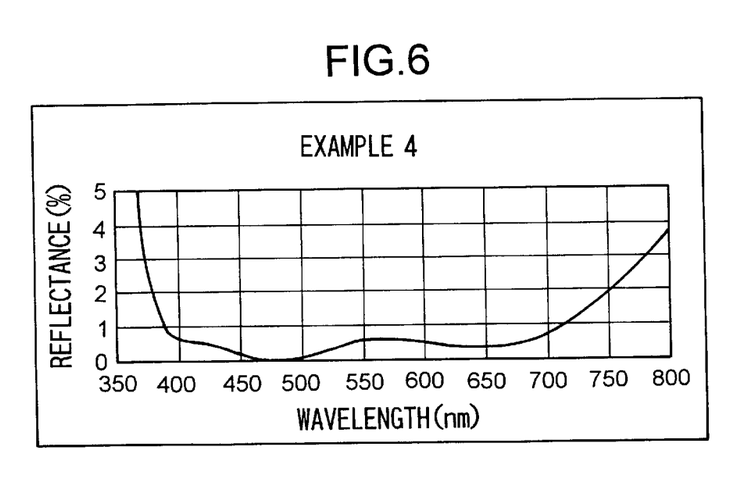
FIG. 6 is a diagram showing the spectral reflectance characteristic of the anti-reflection film of Example 4.

The optical component thus produced was subjected to the same tests as Example 1 to evaluate its physical properties. The results of the evaluation are shown in Table 6, and the spectral reflectance characteristic of the anti-reflection film obtained is shown in FIG. 6.

Comparative Example 1

A plate-shaped molding of a norbornene resin having a polar group ("ARTON FX" manufactured by JSR Corporation) was put in a vacuum chamber of a vacuum deposition machine, and the vacuum chamber was then evacuated to obtain a degree of vacuum of $1\times10^{-3}$ Pa. Then, the materials listed in Table 5 were, in the order listed, vapor-deposited on the molding at ordinary temperatures to form an anti-reflection film. Here, the material of the first layer was heated and evaporated by electrical-resistance heating, and the materials of the second and following layers were heated and evaporated with an electron beam. Moreover, the amount of introduced oxygen was adjusted with a solenoid valve controlled in a manner interlocked with a vacuum gauge so that the degree of vacuum inside the vacuum chamber was kept at $1\times10^{-2}$ Pa for the first layer and at $1\times10^{-3}$ Pa for the second and following layers.

Figure 7:
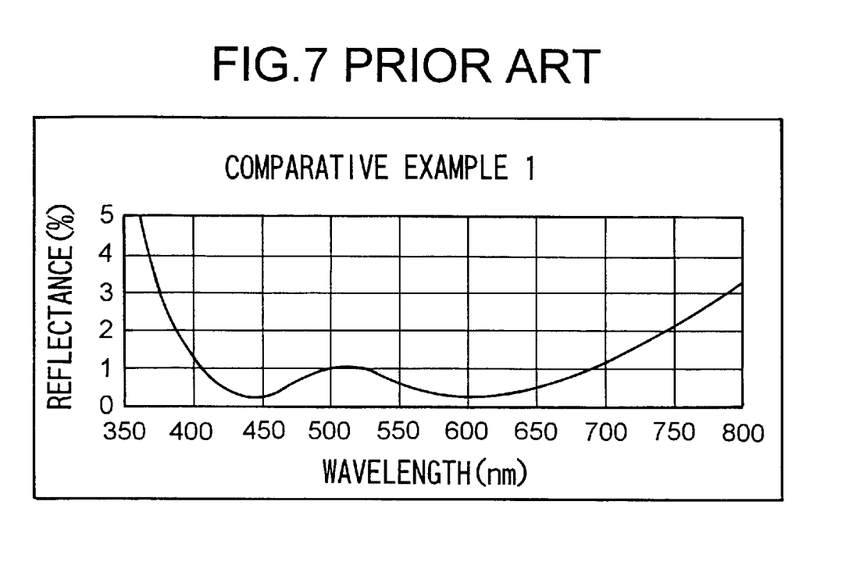
FIG. 7 is a diagram showing the spectral reflectance characteristic of the anti-reflection film of Comparative Example 1.

The optical component thus produced was subjected to the same tests as Example 1 to evaluate its physical properties. The results of the evaluation are shown in Table 6, and the spectral reflectance characteristic of the anti-reflection film obtained is shown in FIG. 7.

Comparative Example 2

An optical component was produced in the same manner as Example 4 except that the molding was not heated with a sheathed heater. The results of the evaluation are shown in Table 6.

As will be clear from Table 6, in the optical components of Examples 1 to 3, which were all produced to fulfill the requirements of the present invention, the anti-reflection film developed neither cracks in the durability and heat-cycle tests nor exfoliation in the adherence test. Similarly, in the optical component of Example 4, which was produced by a production method fulfilling the requirements of the present invention, the anti-reflection film developed neither cracks in the durability and heat-cycle tests nor exfoliation in the adherence test. Moreover, as FIGS. 3 to 6 show, in all of the optical components of Examples 1 to 4, the anti-reflection film exhibited excellent anti-reflection effect.

By contrast, in the optical components of both Comparative Examples 1 and 2, the anti-reflection film developed cracks in the durability test. In addition, in the optical component of Comparative Example 1, the anti-reflection film developed exfoliation in the adherence test.

It is to be noted that, by first heating the molding to 70 to 130° C. and then vapor-depositing the earlier-mentioned intermediate layer on the molding, it is possible to further strengthen the adherence between the anti-reflection film and the molding.

TABLE 1

| | | | Equivalent Film | | | | |
| --- | --- | --- | --- | --- | --- | --- | --- |
| | Molding | Intermediate Layer | First High-Refractive-Index Layer | First Low-Refractive-Index Layer | Overall | Second High-Refractive-Index Layer | Second Low-Refractive-Index Layer |
| Material | | $Al_2O_3$ | $TiO_2$ | $SiO_2$ | | $TiO_2$ | $SiO_2$ |
| d | | 19 | 15 | 29 | | 116 | 86 |
| nd/λ | | 0.06 | 0.07 | 0.08 | 0.21 | 0.53 | 0.25 |
| n | 1.52 | 1.56 | 2.27 | 1.46 | 1.71 | 2.27 | 1.46 | d represents the mechanical film thickness (nm), n represents the refractive index, and nd represents the optical film thickness (these appear also in the following tables); moreover, λ = 495 nm, and the angle of incidence is 0°.

TABLE 2

| | | | Equivalent Film | | | | |
| --- | --- | --- | --- | --- | --- | --- | --- |
| | Molding | Intermediate Layer | First High-Refractive-Index Layer | First Low-Refractive-Index Layer | Overall | Second High-Refractive-Index Layer | Second Low-Refractive-Index Layer |
| Material | | $Al_2O_3$ | $ZrO_2 + TiO_2$ | $SiO_2$ | | $TiO_2$ | $SiO_2$ |
| d | | 19 | 30 | 20 | | 111 | 86 |
| nd/λ | | 0.06 | 0.12 | 0.06 | 0.24 | 0.51 | 0.25 |
| n | 1.52 | 1.56 | 1.94 | 1.46 | 1.71 | 2.27 | 1.46 |

λ = 495 nm, and the angle of incidence is 0°; moreover, $ZrO_2 + TiO_2$ represents mixed crystal of $ZrO_2$ and $TiO_2$.

TABLE 3

| | Molding | Equivalent Film | | | | | |
| --- | --- | --- | --- | --- | --- | --- | --- |
| | | Intermediate Layer | First High-Refractive-Index Layer | First Low-Refractive-Index Layer | Overall | Second High-Refractive-Index Layer | Second Low-Refractive-Index Layer |
| Material | | $Al_2O_3$ | $ZrO_2 + TiO_2$ | $SiO_2$ | | $TiO_2$ | $SiO_2$ |
| d | | 48 | 30 | 19 | | 110 | 86 |
| nd/λ | | 0.15 | 0.12 | 0.05 | 0.32 | 0.50 | 0.25 |
| n | 1.52 | 1.56 | 1.94 | 1.46 | 1.73 | 2.27 | 1.46 |

λ = 495 nm, and the angle of incidence is 0°; moreover, $ZrO_2 + TiO_2$ represents mixed crystal of $ZrO_2$ and $TiO_2$.

TABLE 4

| | Molding | First High-Refractive-Index Layer | First Low-Refractive-Index Layer | Second High-Refractive-Index Layer | Second Low-Refractive-Index Layer |
| --- | --- | --- | --- | --- | --- |
| Material | | $TiO_2$ | $SiO_2$ | $TiO_2$ | $SiO_2$ |
| d | | 15 | 26 | 118 | 84 |
| nd/λ | | 0.07 | 0.08 | 0.53 | 0.25 |
| n | 1.52 | 2.22 | 1.46 | 2.23 | 1.46 |

λ = 495 nm, and the angle of incidence is 0°.

TABLE 5

| | Molding | First High-Refractive-Index Layer | First Low-Refractive-Index Layer | Second High-Refractive-Index Layer | Second Low-Refractive-Index Layer |
| --- | --- | --- | --- | --- | --- |
| Material | | $SiO_2$ | $ZrO_2$ | $ZrO_2 + TiO_2$ | $SiO_2$ |
| d | | 327 | 70 | 66 | 87 |
| nd/λ | | 1.00 | 0.25 | 0.25 | 0.25 |
| n | 1.52 | 1.56 | 1.82 | 1.94 | 1.46 |

λ = 510 nm, and the angle of incidence is 0°.

TABLE 6

| | Example 1 | Example 2 | Example 3 | Example 4 | Comparative Example 1 | Comparative Example 2 |
| --- | --- | --- | --- | --- | --- | --- |
| Durability Test | No Cracks | No Cracks | No Cracks | No Cracks | Cracks Developed | Cracks Developed |
| Heat-Cycle Test | No Cracks | No Cracks | No Cracks | No Cracks | Not Tested | Not Tested |
| Adherence Test | No Exfoliation | No Exfoliation | No Exfoliation | No Exfoliation | Exfoliation Developed | Exfoliation Developed |

What is claimed is:

1. An optical component comprising:

a molding formed out of a material containing a norbornene resin having a polar group; and an anti-reflection film formed on a surface of the molding, the anti-reflection film comprising, from a molding side to an air side:

an equivalent film of which an overall refractive index as calculated according to formula 1 below is 1.52 to 1.8, the equivalent film including, from the molding side to the air side, an intermediate layer measuring 10 to 50 nm in mechanical film thickness and containing $Al_2O_3$, a first high-refractive-index layer, and a first low-refractive-index layer containing $SiO_2$ as a main ingredient, $$N = n_g + \sum_{i=1}^{3}[4(n_i - n_g)n_i d_i] \quad 1$$

where $n_g$ represents a refractive index of the molding and $n_i$ and $d_i$ represent a refractive index and a mechanical film thickness, respectively, of an i-th layer of the equivalent film as counted from the molding side;

a second high-refractive-index layer measuring 0.4λ to 0.6λ, where λ is 480 to 550 nm, in optical film thickness and containing $TiO_2$ as a main ingredient; and a second low-refractive-index layer measuring 0.2λ to 0.3λ, where λ is 480 to 550 nm, in optical film thickness and containing $SiO_2$ as a main ingredient.

2. An optical component as claimed in claim 1, wherein the equivalent film measures 0.2λ to 0.3λ, where λ is 480 to 550 nm, in optical film thickness.

3. An optical component as claimed in claim 1, wherein the first high-refractive-index layer of the equivalent film contains $TiO_2$.

4. An optical component as claimed in claim 3, wherein the first high-refractive-index layer of the equivalent film is made solely of $TiO_2$.

5. An optical component as claimed in claim 3, wherein the first high-refractive-index layer of the equivalent film is made of mixed crystal of $TiO_2$ and $ZrO_2$.

6. An optical component comprising:

a molding formed out of a material containing a norbornene resin having a polar group; and an anti-reflection film formed on a surface of the molding, the anti-reflection film comprising, from a molding side to an air side:

a first high-refractive-index layer containing $TiO_2$ as a main ingredient and formed with the molding heated to 70 to 130° C.;

a first low-refractive-index layer containing $SiO_2$ as a main ingredient;

a second high-refractive-index layer measuring $0.4\lambda$ to $0.6\lambda$, where $\lambda$ is 480 to 550 nm, in optical film thickness and containing $TiO_2$ as a main ingredient; and a second low-refractive-index layer measuring $0.2\lambda$ to $0.3\lambda$, where $\lambda$ is 480 to 550 nm, in optical film thickness and containing $SiO_2$ as a main ingredient.

* * * * *